Oct. 13, 1970 A. LE ROY LIMBERG 3,534,279

HIGH CURRENT TRANSISTOR AMPLIFIER STAGE OPERABLE WITH LOW CURRENT BIASING

Filed Aug. 12, 1968

INVENTOR
ALLEN L. LIMBERG

BY Charles Brodsky
ATTORNEY

United States Patent Office 3,534,279
Patented Oct. 13, 1970

3,534,279
HIGH CURRENT TRANSISTOR AMPLIFIER STAGE OPERABLE WITH LOW CURRENT BIASING

Allen Le Roy Limberg, Somerville, N.J., assignor to RCA Corporation, a corporation of Delaware Filed Aug. 12, 1968, Ser. No. 751,962
Int. Cl. H03f 3/04
U.S. Cl. 330—22 8 Claims

ABSTRACT OF THE DISCLOSURE

A high current amplifier stage operable with low current biasing and particularly suited for integrated circuit fabrication includes first and second transistors having their respective base electrodes coupled to a first common voltage point by means of a pair of resistors. Their respective emitter electrodes are coupled to a second common voltage point, with the coupling from the emitter electrode of the first transistor being by way of a third resistor and from the emitter electrode of the second transistor being by way of a connection of substantially less impedance than that of the third resistor. The respective collector electrodes are coupled to receive applied energizing potentials, with the collector electrode of the first transistor being additionally directly connected to the first common voltage point. The first transistor provides a low current bias for the second transistor, which operates to develop at its collector electrode, a high current, amplified version of an input signal supplied to its base electrode.

This invention relates to amplifier stages, in general, and to a high current transistor amplifier stage operable with low current biasing, in particular. As will become clear hereinafter, such an amplifier stage is particularly suited for integrated circuit fabrication in that it comprises substantially only transistor and resistor functional portions whose implementations and manners of interconnection in a monolithic chip are well known in the art.

In accordance with an embodiment of the invention, a pair of transistors have their respective base electrodes coupled to a first common voltage point by means of a pair of resistors; their respective emitter electrodes coupled to a second common voltage point, with the coupling from the emitter electrode of the first transistor being by way of a third resistor and from the emitter electrode of the second transistor being by way of a connection of substantially less impedance than that of the third resistor (e.g. a direct connection); and their respective collector electrodes coupled to receive applied energizing potentials. With the collector electrode of the first transistor being directly connected to the first common voltage point, in addition, the first transistor provides a low current bias to the second transistor, which operates to develop at its collector electrode, a high current, amplified version of an input signal supplied to its base electrode.

In a preferred embodiment of the invention, the resistance value of the resistor coupling the first transistor base electrode to the first common voltage point is selected to be greater than the resistance value of the resistor coupling the second transistor base electrode to that point by an amount substantially equal to the ratio between the second transistor quiescent collector electrode current and the first transistor quiescent collector electrode current.

The above general structure of the present invention and the advantages the invention provides are more fully described in the specification and detailed description which follows, taken in connection with the accompanying drawings in which.

Figure 1:
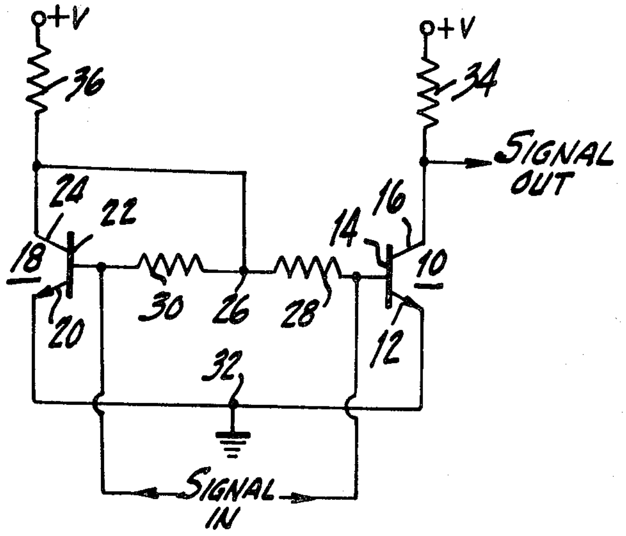
FIG. 1. PRIOR ART
FIG. 1 is a schematic circuit diagram of a common emitter amplifier stage biased according to a prior art arrangement.

Referring to FIG. 1, there is shown a prior art common emitter amplifier stage of the type described in U.S. Pat. 3,364,434, issued on Jan. 16, 1968. The stage comprises an amplifier transistor 10 having emitter, base and collector electrodes 12, 14, and 16, respectively, and a biasing transistor 18 having corresponding electrodes 20, 22 and 24. The base electrodes 14 and 22 are coupled to a first common voltage point 26 via resistors 28 and 30, while the emitter electrodes 12 and 20 are directly connected to a second common voltage point 32, which typically may be ground. The collector electrodes 16 and 24 are each coupled to a source of energizing potential, the collector electrode 16 by means of a resistor 34 and the collector electrode 24 by means of a resistor 36. The collector electrode 24 is further connected to the common voltage point 26, with the resistors 28 and 30 coupled thereto being of equal value. Input signals supplied to the base electrodes 14 and 22 will be amplified by the transistors 10 and 18 and will be developed as amplified at the collector electrode 16. Pat. 3,364,434 also discloses an alternative arrangement in which equal valued resistors may be inserted between the respective emitter electrodes 12 and 20 and the common voltage point 32.

Each of the above prior art common emitter amplifier stage configurations serves to provide a quiescent collector current for transistor 10 which is equal to that for transistor 18, independent of changes in transistor characteistics due to temperature variations which are common to both. That is, with the amplifier stage fabricated by integrated circuit techniques to provide matching of, and thermal coupling between, transistors 10 and 18, and with the value of resistor 28 being equal to that of resistor 30, the collector currents of the transistors will be substantially identical as long as transistor 10 is not in saturation, since both base electrodes 14 and 22 will be driven from the same source—the common voltage point 26.

Such similarities of current proves disadvantageous, however, where the amplifier arrangement serves as the high current output stage of a signal channel incoporated on an integrated chip, for example. With energizing potential sources of similar value, it will be noted that the power dissipation incurred in the biasing portion will be comparable to that incurred in the amplifying portion—100 milliwatts or so, where the collector output current is 10 milliamps drawn from a 10 volt source. As will be well appreciated, this 100 milliwatts of dissipation in the biasing portion represents a substantial percentage of allowable dissipation on an integrated chip, and is unduly wasted.

One suggested way of reducing this unnecessary dissipation is to vary the ratio between resistors 28 and 30, so as to cause related, but not equal, collector currents to flow in the transistors 10 and 18. By selecting resistor 30 to be twice the resistance value of resistor 28, for instance, the collector current in the biasing portion of the amplifier arrangement can be shown to be reduced—but, the collector current in the amplifying portion would then become undesirably dependent upon the forward current gains (betas) of the two transistors and would tend to vary from chip to chip.

Figure 2:
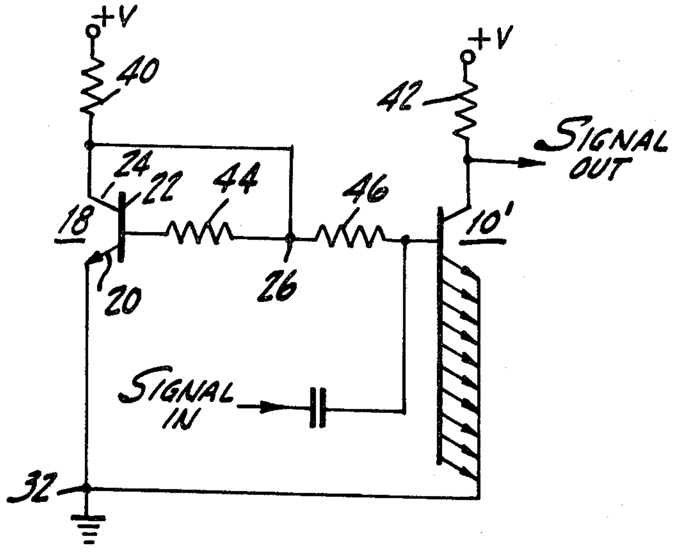
FIG. 2. PRIOR ART
FIG. 2 is a schematic circuit diagram of a prior art modification of the common emitter amplifier stage of FIG. 1.

A second suggested way, shown in FIG. 2, effectively employs the biasing portion to bias several amplifying portions connected in parallel. For ten output transistors, represented in parallel connection, the resistance ratio between the collector electrode resistors 40 and 42 would be 10:1, and the same ratio would substantially hold for the base electrode coupling resistors 44 and 46. Such an arrangement is disadvantageous, however, because it requires appreciable area on the chip.

Figure 3:
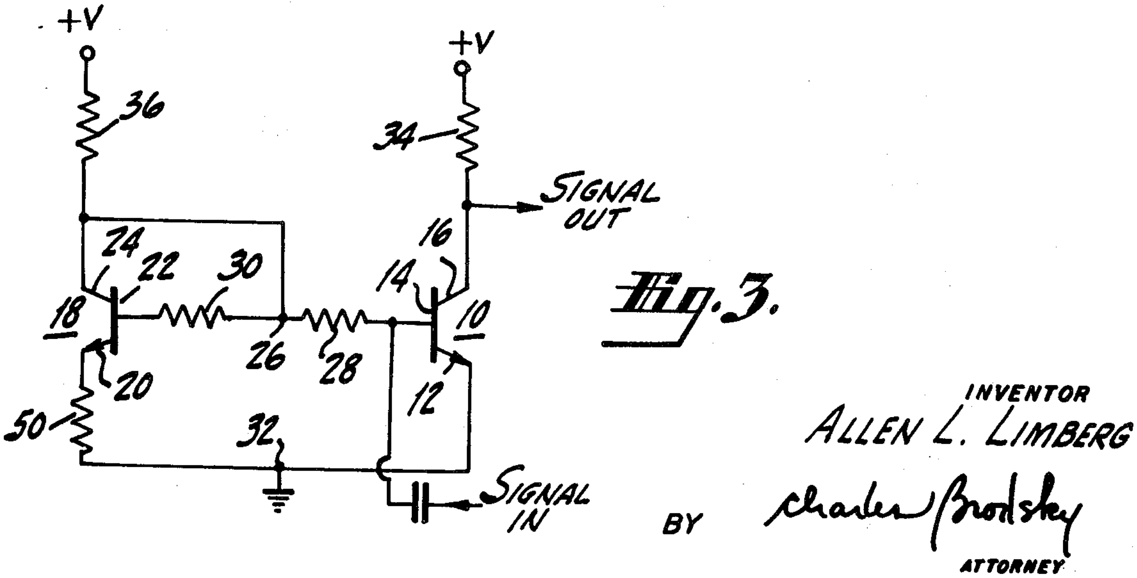
FIG. 3 is a schematic circuit diagram of a common emitter amplifier stage embodying the invention.

According to the present invention, on the other hand, the power dissipation in the biasing portion can be substantially reduced, without introducing dependency upon forward current gain nor requiring any appreciable additional chip area. A common emitter amplifier embodying this invention is illustrated in FIG. 3 and, as shown, adds to the FIG. 1 configuration, a resistor 50 between the emitter electrode 20 and the common voltage point 32, the emitter electrode 12 remaining directly connected to that point. A mathematical analysis of this circuit is as follows:

(a) the voltage at the common point 26 is given by the expression:

$$V_{BE_{18}}+I_{E_{18}}R_{50}+I_{B_{18}}R_{30}=V_{BE_{10}}+I_{B_{10}}+R_{28} \quad (1)$$

where $V_{BE_{10}}$ and $V_{BE_{18}}$ are the forward base-to-emitter voltage drops of transistors 10 and 18 respectively, $I_{B_{10}}$ and $I_{B_{18}}$ are the respective base currents of those two transistors, $I_{E_{18}}$ is the emitter current of transistor 18, and $R_{50}$, $R_{28}$ and $R_{30}$ are the resistance values of resistors 50, 28 and 30.

(b) by substituting the fraction $$\frac{kT}{q}\log_e\left(\frac{I_c}{I_s}\right)$$

for the $V_{BE}$ term and the following relationships in Expression 1

$$I_{B_{18}}=\frac{I_{c_{18}}}{\beta_{18}};\ I_{B_{10}}=\frac{I_{c_{10}}}{\beta_{10}};\ I_{E_{18}}=\frac{\beta_{13}I_{c_{18}}}{\beta_{18}+1}$$

Expression 1 becomes upon re-arranging:

$$\frac{kT}{q}\log_e\left(\frac{I_{c_{18}}}{I_{s_{18}}}\right)+I_{c_{18}}\left(\frac{\beta_{18}R_{50}}{\beta_{18}+1}+\frac{R_{30}}{\beta_{18}}\right)=\frac{kT}{q}\log_e\left(\frac{I_{c_{10}}}{I_{s_{10}}}\right)+I_{c_{10}}\frac{R_{28}}{\beta_{10}} \quad (2)$$

where $k$ is the Boltzmann constant, T is the absolute temperature, $q$ is the unit charge upon an electron, $I_{c_{10}}$ and $I_{c_{18}}$ are the collector currents of transistors 10 and 18 respectively, $I_{s_{10}}$ and $I_{s_{18}}$ are the respective leakage currents of those two transistors, and $\beta_{10}$ and $\beta_{18}$ are the forward current gains of transistors 10 and 18.

(c) assuming that $\beta_{10}=\beta_{18}$ and $I_{s_{10}}=I_{s_{18}}$, as they should be in an integrated circuit environment, and that $\beta_{10}$ is large, then Expression 2 can be re-written as:

$$I_{c_{18}}\left(R_{50}+\frac{R_{30}-mR_{28}}{\beta_{10}}\right)=\frac{kT}{q}\log_e m \quad (3)$$

where $m$ is the fraction $I_{c_{10}}/I_{c_{18}}$.

This latter expression essentially comprises the defining design equation for the common-emitter amplifier arrangement of FIG. 3. With the same assumptions as in (c) above, it can be shown that the corresponding defining design equation for the prior art arrangement of FIG. 1 is given by the expression:

$$I_{c_{18}}\left(\frac{R_{30}-mR_{28}}{\beta_{10}}\right)=\frac{kT}{q}\log_e m \quad (4)$$

the same definitions of terms being used throughout.

Furthermore, the equations for the collector current flow in transistor 18 in the FIGS. 1 and 3 configurations can be respectively represented as:

$$I_{c_{18}}=\frac{V-V_{BE_{18}}-I_{B_{18}}R_{30}}{R_{36}} \quad (5)$$

and $$I_{c_{18}}=\frac{V-V_{BE_{18}}-I_{B_{18}}R_{30}-I_E R_{50}}{R_{36}} \quad (6)$$

where V is the voltage value of the energizing potential source for the transistor 18 and $R_{36}$ is the resistance value of the resistor 36. Noting that the $I_{B_{18}}$ and $R_{50}$ terms are small and that $V_{BE_{18}}$ approximates 0.75 volt for an integrated circuit transistor, Equations 5 and 6 can each be approximated by:

$$I_{c_{18}}=\frac{V-0.75}{R_{36}} \quad (7)$$

It can be seen from Expressions 4 and 7 describing the arrangement of FIG. 1 that with selected values for V and $R_{36}$ to give a predetermined $I_{c_{18}}$ current flow, in order to provide an $I_{c_{10}}$ current flow which is $m$ times greater, the resistance ratio selected for $R_{28}$ and $R_{30}$ would have to be varied as $\beta_{10}$ varied, such as, for example, from chip to chip (except for the unique case where $m=1$ *and* $R_{30}=R_{28}$). From Expressions 3 and 7 describing the FIG. 3 configuration, on the other hand, it can be seen that the effect of $\beta_{10}$ variation is decreased due to the presence of the $R_{50}$ term. Indeed, $R_{30}$ may be made equal to $mR_{28}$, thereby obviating the dependence of the ratio $m$ upon $\beta_{10}$ variations for any value of $m$. Consider the following illustrations:

(a) V is selected to be 10 volts and $R_{36}$ to be 9.1 kilohms so as to give an $I_{c_{18}}$ current flow of 1 milliamp; $I_{c_{10}}$ is desired to be 10 milliamps ($m=10$), $R_{28}$ is chosen as 500 ohms, and $q/kT$ has the value 33 millimhos per milliamp at room temperature; for an assumed $\beta_{10}$ of 50, $R_{30}$ in the FIG. 1 configuration (Expression 4) is calculated to be 8.5 kilohms; but in a different integrated chip environment where $\beta_{10}$ is 60 instead of 50 due to tolerance variations in the manufacturing processes, $R_{30}$ would have to be 9.2 kilohms in order to maintain the same 10:1 current ratio—a change of 8.2%.

(b) V, $R_{36}$, $m$, $R_{28}$ and $q/kT$ are as in (a) above, with $R_{50}$ in the FIG. 3 arrangement selected to be 50 ohms; for an assumed $\beta_{10}$ of 50, $R_{30}$ is calculated to be 6.0K (Expression 3), while $R_{30}$ is calculated to be 6.2K in the environment where $\beta_{10}$ is 60—a change of 3.3%.

(c) V, $R_{36}$, $m$, $R_{28}$ and $q/kT$ are as in (a) above, with $R_{50}$ in the FIG. 3 arrangement selected to be 70 ohms; for an assumed $\beta_{10}$ of 50, $R_{30}$ is calculated as 5.0K, the same value as in the environment where $\beta_{10}$ is 60—indicating freedom from $\beta_{10}$ variations.

The following table shows the comparative decrease in $\beta_{10}$ dependency for the common-emitter amplifier stage of FIG. 3 as contrasted with that of FIG. 1:

| | V volts | $R_{36}$ KΩ | $m$ | $R^{28}$ Ω | $\frac{q}{kT}$ | $B_{10}$ | $R_{50}$ $\Omega_{10}$ | $R_{30}$ KΩ | Percent change |
|---|---|---|---|---|---|---|---|---|---|
| Figure 1 | 10 | 9.1 | 10 | 500 | 33 | 50 | ------ | 8.5 | 8.2 |
| | | | | | | 60 | ------ | 9.2 | |
| Figure 3 | | | | | | 50 | 20 | 7.5 | 6.7 |
| | | | | | | 60 | 20 | 8.0 | |
| | | | | | | 50 | 30 | 7.0 | 5.7 |
| | | | | | | 60 | 30 | 7.4 | |
| | | | | | | 50 | 40 | 6.5 | 4.6 |
| | | | | | | 60 | 40 | 6.8 | |
| | | | | | | 50 | 50 | 6.0 | 3.3 |
| | | | | | | 60 | 50 | 6.2 | |
| | | | | | | 50 | 60 | 5.5 | 1.8 |
| | | | | | | 60 | 60 | 5.6 | |
| | | | | | | 50 | 70 | 5.0 | 0 |
| | | | | | | 60 | 70 | 5.0 | |

A preferred embodiment of the invention will thus be seen to be that where the resistance value of $R_{30}$ equals $m$ times the resistance value of $R_{28}$, where there is zero percentage change (i.e., no dependency upon forward current gain). In general, however, improved performance will measurably be obtained whenever the resistance ratio $$\frac{R_{30}-mR_{28}}{\beta_{10}}$$

is less than $R_{50}$. In those instances where the current gains of transistors 10 and 18 are not equal, a preferred embodiment of the invention can be shown to be one where $$\frac{R_{30}}{\beta_{10}}=\frac{mR_{28}}{\beta_{18}}$$

Improved performance will again be measurably obtained, in general, whenever $$\frac{R_{30}}{\beta_{10}}-\frac{mR_{28}}{\beta_{18}}$$

is less than $R_{50}$.

What is claimed is:

1. In an amplifier stage including first and second transistors having base, emitter and collector electrodes, with their respective base electrodes coupled to a first common voltage point by a pair of resistors, their respective collector electrodes coupled to receive applied energizing potentials, and with the collector electrode of said first transistor being additionally coupled to said first common voltage point, wherein the improvement comprises:

means including a third resistor for coupling the emitter electrode of said first transistor to a second common voltage point; and means for coupling the emitter electrode of said second transistor to said second common voltage point by a direct connection of substantially zero impedance;

whereby said second transistor is operative to develop a high collector electrode current in response to a collector electrode current in said first transistor of measurably lower value.

2. In an amplifier stage including first and second transistors having base, emitter and collector electrodes, with their respective base electrodes coupled to a first common voltage point by a pair of resistors, their respective collector electrodes coupled to receive applied energizing potential, and with the collector electrode of said first transistor being additionally coupled to said first common voltage point, wherein the improvement comprises:

means including a third resistor for coupling the emitter electrode of said first transistor to a second common voltage point; and means for coupling the emitter electrode of said second transistor to said second common voltage point by a connection of substantially less impedance than that of said third resistor;

said third resistor having a resistance value greater than the expression $$\frac{R_1}{\beta_1}-\frac{mR_2}{\beta_2}$$

where $R_1$ and $R_2$ are the respective resistance values of the resistors coupling the base electrodes of said first and second transistors to said first common voltage point, $m$ is the ratio between the collector electrode current in said second transistor to the collector electrode current in said first transistor, and $\beta_1$ and $\beta_2$ are the forward current gains of said first and second transistors, respectively;

whereby said second transistor is operative to develop a high collector electrode current in response to a collector electrode current in said first transistor of measurably lower value.

3. In an amplifier stage including first and second transistors having base, emitter and collector electrodes, with their respective base electrodes coupled to a first common voltage point by a pair of resistors, their respective emitter electrodes coupled to a second common voltage point, and their respective collector electrodes coupled to receive applied energizing potentials, and with the collector electrode of said first transistor being additionally coupled to said first common voltage point, wherein the improvement comprises:

means including a third resistor for coupling the emitter electrode of said first transistor to said second common voltage point; and means for coupling the emitter electrode of said second transistor to said second common voltage point by a connection of substantially less impedance than that of said third resistor;

the resistance values of said pair of resistors being determined by the expression $$\frac{R_1}{\beta_1}=\frac{mR_2}{\beta_2}$$

where $R_1$ and $R_2$ are the respective resistance values of the resistors coupling the base electrodes of said first and second transistors to said first common voltage point, $m$ is the ratio between the collector electrode current in said second transistor to the collector electrode current in said first transistor, and $\beta_1$ and $\beta_2$ are the forward current gains of said first and second transistors, respectively;

whereby said second transistor is operative to develop a high collector electrode current in response to a collector electrode current in said first transistor of measurably lower value.

4. In an amplifier stage as defined in any one of claims 1, 2 or 3 wherein said first and second transistors are of the same polarity type and have matched characteristics; and the resistance values of said pair of resistors are determined by the expression $$R_1=mR_2$$

where $R_1$ and $R_2$ are the respective resistance values of the resistors coupling the base electrodes of said first and second transistors to said first common voltage point and $m$ is the ratio between the collector electrode current in said second transistor to the collector electrode current in said first transistor.

5. Electric circuit means comprising:

an output transistor having base, emitter and collector electrodes;

means for coupling said emitter electrode to a common voltage point;

output means coupled to said collector electrode for providing a path for collector current of said output transistor;

biasing means coupled between said base and emitter electrodes, said biasing means comprising:

a biasing transistor having base, emitter and collector electrodes;

a first resistor for coupling said biasing transistor collector electrode to a source of energizing potential;

a second resistor coupled between said biasing transistor emitter electrode and said common voltage point; and means comprising third and fourth resistors direct coupled, respectively, from the bases of said output and biasing transistors to the collector electrode of said biasing transistor for biasing said output transistor to produce quiescent collector current therein determined by and substantially greater than quiescent collector current in said biasing transistor.

6. Electric circuit means according to claim 5 wherein:

said first resistor has a relatively large resistance said second resistor has a relatively small resistance.

7. Electric circuit means according to claim 6 wherein:

said emitter electrode of said output transistor is directly connected to said common voltage point by substantially zero impedance.

8. Electric circuit means according to claim 7 and further comprising:

means for coupling signals to be amplified to said base electrode of said output transistor;

said output means comprising an output impedance coupled to said source of energizing potential whereby amplified output signals are developed across said output impedance.

References Cited

FOREIGN PATENTS 840,953 7/1960 Great Britain.

ROY LAKE, Primary Examiner

S. H. GRIMM, Assistant Examiner

U.S. Cl. X.R.

330—38, 40

UNITED STATES PATENT OFFICE

CERTIFICATE OF CORRECTION

Patent No. 3,534,279 Dated October 13, 1970

Inventor(s) Allen LeRoy Limberg

It is certified that error appears in the above-identified patent and that said Letters Patent are hereby corrected as shown below:

Column 3, line 23 that portion of the expression reading $I_{B_{10}} + R_{28}$ should read $I_{B_{10}} \; R_{28}$ Column 4, line 58 that portion reading "$R_{50}$ $\Omega_{10}$" should read --$R_{50}$ $\Omega$--.

SIGNED AND SEALED

DEC 15 1970

(SEAL)

Attest:

Edward M. Fletcher, Jr.

Attesting Officer

WILLIAM E. SCHUYLER, JR.

Commissioner of Patents

FORM PO-1050 (10-69)

USCOMM-DC 60376-P69

☆ U.S. GOVERNMENT PRINTING OFFICE : 1969 O—366-334